Patented Feb. 5, 1952

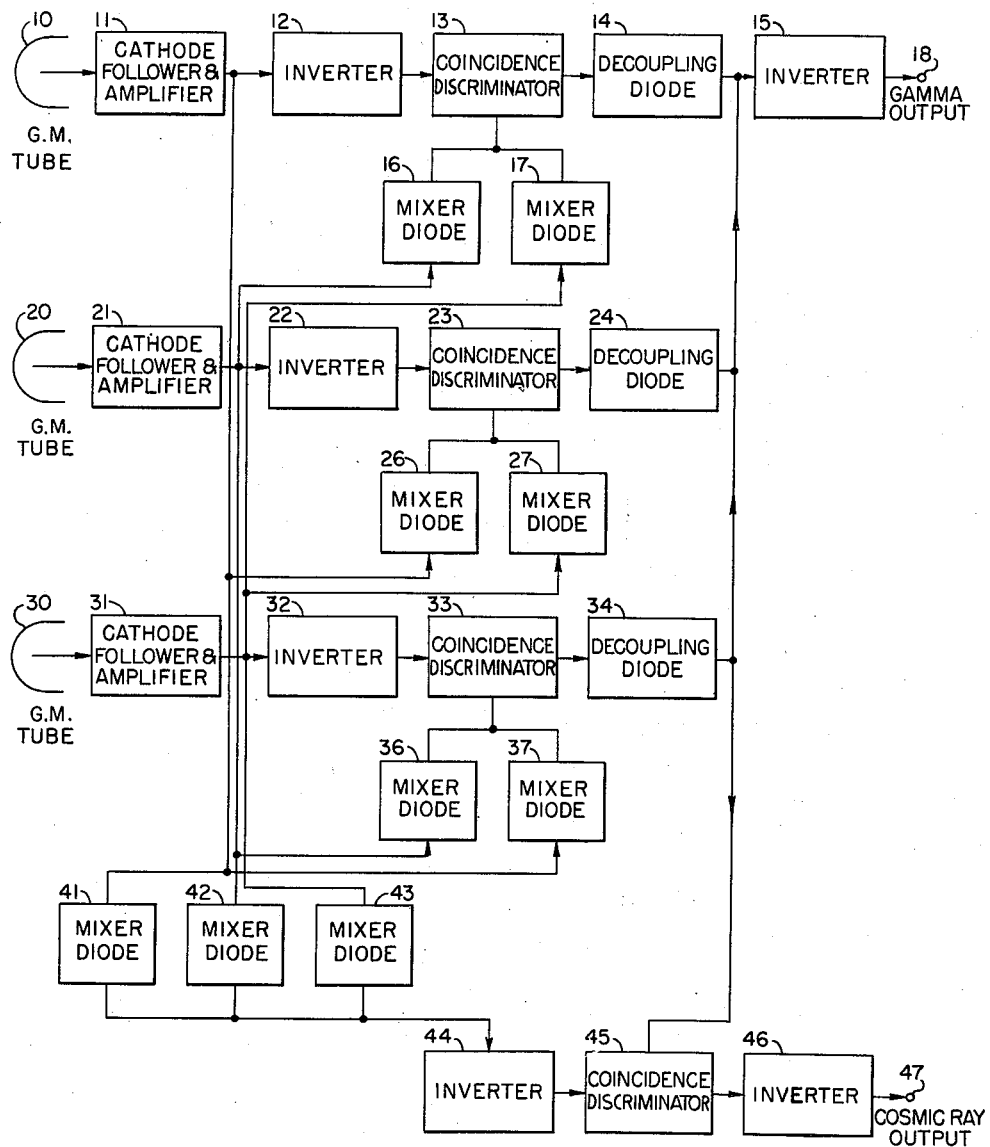

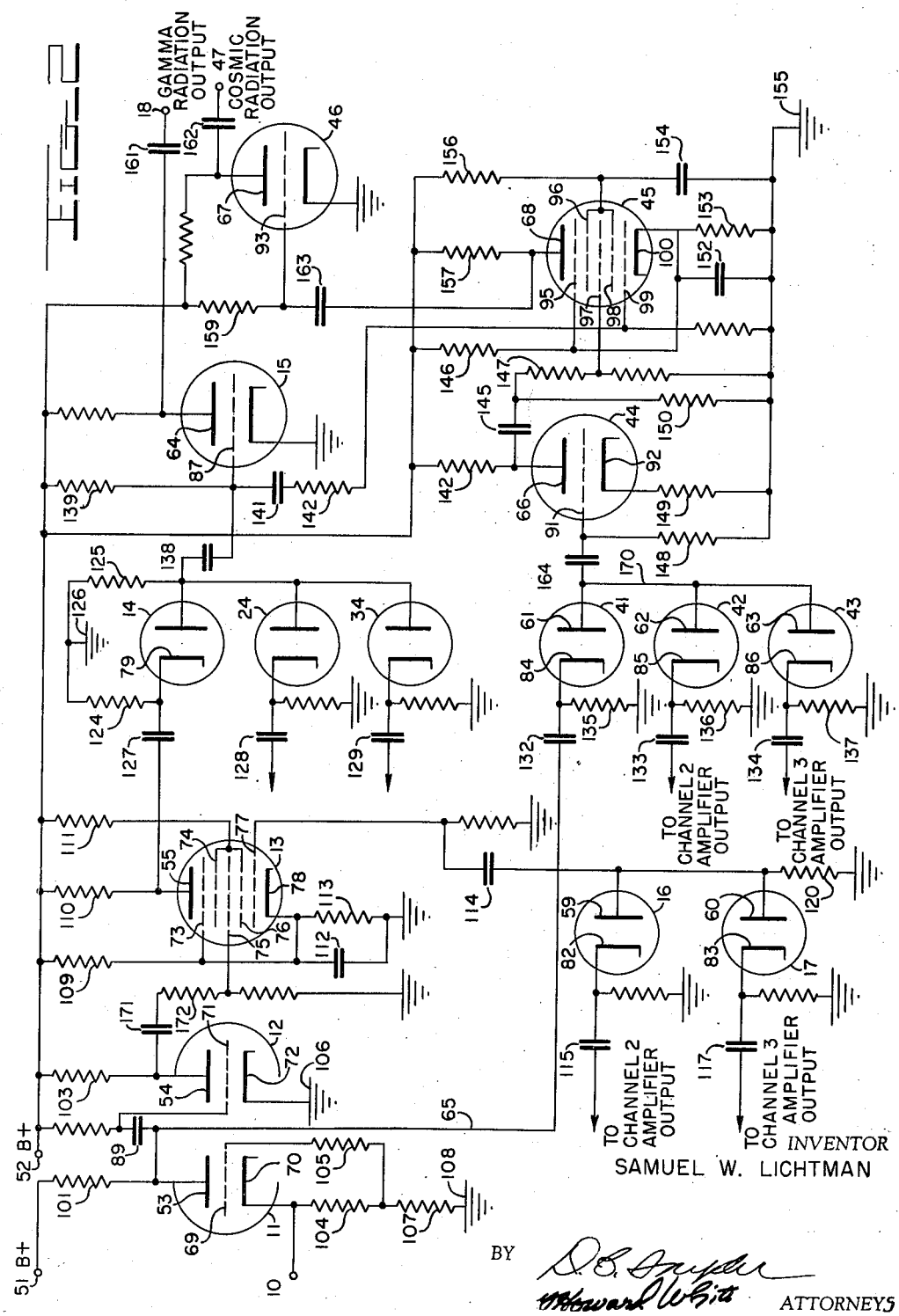

2,584,138

UNITED STATES PATENT OFFICE 2,584,138

RADIOACTIVITY DETECTOR AND DISCRIMINATOR

Samuel W. Lichtman, Oxon Hill, Md.

Application May 12, 1950, Serial No. 161,676

8 Claims. (Cl. 250—83.6)

(Granted under the act of March 3, 1883, as amended April 30, 1928; 370 O. G. 757)

The present invention relates in general to electrical circuits operable to discriminate between synchronous and non-synchronous signals derived from a plurality of signal sources and in particular to the detection and separation of signals produced in a bundle of radiation countertubes exposed to gamma and cosmic radiation.

In cosmic ray studies and in nuclear physics investigations a bundle of closely spaced Geiger-Mueller tubes, connected electrically in parallel relation, is employed to detect cosmic and gamma radiation. Separation of the highly ionizing cosmic radiation from the poorly ionizing gamma radiation is usually predicated upon the ability of the circuits employed to distinguish between single order firing of the tubes caused by gamma radiation and coincident firing of the tubes caused by cosmic radiation. This method of distinguishing cosmic and gamma radiation is well known to the art and the circuits employed generally consists of some form of amplitude discrimination, so connected to the counter bundle to distinguish between the large amplitude pulses caused by cosmic radiation and the lower amplitude pulses caused by gamma radiation. Because of the need for maintaining output waveform consistency and critical voltage relationships for amplitude discrimination, the use of amplitude discrimination is often objectionable. This is particularly objectionable where the apparatus must perform continuously over long periods of time with minimum amount of necessary attendance.

The present invention teaches a system for separating synchronous and non-synchronous signals originating from a multiplicity of separate signal sources. Also the present invention provides a system wherein the proper operation is not critically dependent upon the wave shape or amplitude of the exciting pulses.

It is accordingly an object of the present invention to provide a new and improved cosmic-gamma radiation detection and separation system.

A further object of the present invention is to provide a cosmic-gamma radiation detection and separation system operable to distinguish between synchronous and non-synchronous firing events in a multiplicity of radiation counter tubes.

Another object of the present invention is to provide a cosmic-gamma radiation detection and separation system operable independently of the wave shape or amplitude of the exciting pulses.

Another object of the present invention is to provide a multiple-channel separator for indicating the presence of synchronous or non-synchronous signals derived from a multiplicity of signal sources.

Another object of the present invention is to provide a multiple-channel signal separator operable to indicate the presence of an output appearing from one of the signal sources but inoperable in the presence of an output from more than one signal source.

Still another object of the present invention is to provide a multiple-channel signal separator having appropriate decoupling means for preventing interaction between signal channels.

Other objects and attainments of the present invention will become apparent from the following detailed description when taken in conjunction with the drawings in which:

Fig. 1 is a schematic block diagram of a typical gated-group discriminator of the present invention, and Fig. 2 is a detailed schematic circuit diagram of the gated-group discriminator shown in Fig. 1.

In general and in accordance with the spirit and scope of the present invention a bundle of Geiger tubes is used as previously indicated, to detect highly ionizing cosmic radiation and poorly ionizing gamma radiation. Cosmic radiation is separated from gamma radiation through the use of a gated-group discriminator which consists primarily of a plurality of signal channels, one for each Geiger tube in the bundle for producing an output indicative of the detection of gamma radiation. Cosmic radiation is indicated, through an additional channel, by coupling all the input signals to a single mixer unit and then to a coincidence discriminator. Finally the present invention teaches a method of and means for inter-connecting the plurality of channels to prevent an ouput therefrom when a signal is detected by more than one of the Geiger tubes in the bundle and also teaches a method and means of preventing an output from the cosmic radiation channel when the signal originates from a single tube in the bundle.

For purposes of this application the term gated-group discriminator may be defined as a system wherein the on-off signal switching is dependent upon conduction and non-conduction operation of an electronic tube and wherein the on-off signal switching is furnished by a group of separate signal sources.

Referring now to the drawings and in particular to Fig. 1 there is shown a block-schematic diagram of a gated-group discriminator for separating gamma radiation from cosmic radiation. The system comprises generally a plurality of separating channels, one channel for each Geiger tube employed in the bundle and an additional channel connected to all the Geiger tubes. It is, of course, understood the number of channels shown is merely exemplary and any number of channels may be employed if desired. There is shown in Fig. 1 three Geiger tubes 10, 20 and 30 and three separating channels associated with the three Geiger tubes.

In operation of the block-schematic diagram shown in Fig. 1, a pulse signal (negative) from any one of the Geiger tubes 10, 20 or 30 is applied to a cathode follower-amplifier 11, 21 or 31 which in turn act as low-impedance drivers for exciting the various mixer diodes shown in the figure. As will be explained hereinafter, the mixer diodes act to prevent an output from any one channel affecting the output of any other channel. The negative polarity pulse is also inverted in an inverter 12, 22 or 32 and impressed as a positive polarity pulse on an outer grid element of a gated coincidence discriminator tube 13, 23 or 33. Coincidence discriminator tubes 13, 23 and 33 are normally biased to plate current cut-off condition and operate so that a positive polarity signal pulse applied to one of the grid elements is communicated to the output load provided that no signal of negative polarity is present at the same time on a second grid element, as described hereinafter.

The positive polarity pulse impressed on the outer grid element of coincidence discriminators 13, 23 or 33 raises the normally biased to cut-off discriminator to the conducting state. A negative polarity pulse is thereby produced in the anode circuit and passes through a diode decoupler 14, 24 or 34 to common inverter 15 for all the channels. Diode decouplers 14, 24 and 34 serve to permit paralleling of all output channel pulses on a common line without mutual interaction between the several channels. An output pulse (negative) from any one of the decouplers 14, 24 and 34 is inverted in the single inverter 15 and finally appears as a pulse of positive polarity at the single count (gamma) output terminal 18.

Coincident operation of two or more of the Geiger tubes 10, 20 and 30, upon the detection of cosmic radiation, is prevented from producing an output at terminal 18 by the arrangement of the group of diode mixer units associated with each channel. The output from each of the channel cathode followers is connected to the discriminator tube of all the other channels through a separate diode mixer element. This is shown in the block schematic diagram by mixer diodes 16 and 17 of the first channel tied to the amplifiers 21 and 31 of the second and third channels; mixer diodes 26 and 27 of the second channel tied to the amplifiers 11 and 31 of the first and third channels; and the mixer diodes 36 and 37 of the third channel tied to the amplifiers 11 and 21 of the first and second channels.

The diode mixer units associated with each channel are simultaneously tied to what may be called the reject grid of the coincidence discriminators 13, 23 and 33. As described above, the appearance of a negative pulse on a grid of the coincidence discriminator will prevent conduction therein. Since each pair of mixer units are coupled to two amplifiers of the remaining two channels, a negative pulse appearing in any of the other channels will be impressed as a negative polarity pulse upon the reject grid of the discriminators of the other channels. A negative polarity pulse on the reject grid of the coincidence discriminator will thereby maintain cut-off condition and suppress transmission of any positive signal which may concurrently be present at the control grid of the corresponding discriminator.

Coincident count output (cosmic radiation) is obtained from the circuits illustrated in the blocks numbered in the 40 series. The signals appearing in any one of the amplifiers 11, 21 or 31 are passed through respective mixer diodes 41, 42 and 43 to the grid of inverter 44. This results in the application of a positive polarity pulse on the control grid of coincidence discriminator 45, whenever any of the tubes 10, 20 and 30 are fired. Coincidence discriminator 45 is normally maintained in a non-conducting state in the same manner as coincidence discriminators 13, 23 and 33 and is rendered conductive with a positive pulse on its control grid in the absence of a negative pulse on its reject grid. Coincident discriminator 45 is thereby rendered conductive upon the application of the positive pulse from inverter 44. Conduction in coincidence discriminator 45 produces a negative polarity pulse at its anode which is inverted in inverter 46 and presented as a positive polarity pulse at the coincident (cosmic radiation) output terminal 47.

In the event that more than one Geiger tube is energized at a time, described above, the mixer diodes, 16, 17, etc., and discriminators 13, 23, etc. would prevent an output pulse from appearing at terminal 18 (gamma output). Normally, however, if only one Geiger tube is energized the coincident channel (cosmic output) would also produce an output as just described. There is incorporated in the present invention additional circuitry to prevent the cosmic channel from rendering an output when the signal is originating from a single channel in order that only cosmic radiation may be indicated at output terminal 47. This is simply achieved by tying the negative polarity pulse that may appear at the input of inverter 15 to the reject grid of cosmic discriminator 45. The presence of the negative polarity pulse on the reject grid of the cosmic discriminator nullifies the effect of any positive polarity pulse applied to the control grid of this discriminator from the mixer units 41, 42 or 43 thereby preventing conduction therein.

It is seen then that there appears at output terminal 18 a signal that can only have its source from gamma radiation and there appears at output terminal 47 a signal that can only have its source from cosmic radiation. There can be no output on the terminal of one if there is an output at the terminal of the other.

A constructed embodiment of the system just described has a resolving time of 50 microseconds thereby preventing danger of loss of very low cosmic count. For some special applications this resolving time may be reduced by one order of magnitude or more by the use of well known pulse circuit design techniques.

Referring now to Fig. 2 there is shown the circuitry of the gated-group coincidence discriminator as taught in Fig. 1. The vacuum tubes in Fig. 2 carry the same reference numerals as their counterparts in Fig. 1. Only one of the single-count (gamma) channels is shown in Fig. 2 for purposes of simplicity, as the circuitry of the remaining channels is identical.

A signal arising from point source 10 is applied to the cathode 70 of grounded grid amplifier 11. Amplifier 11 has its anode 53 tied to a point of positive potential 51 through plate resistor 101. Grid 69 of amplifier 11 is grounded at point 108 through resistors 105 and 107, and has its cathode 70 grounded to point 108 through resistors 104 and 107.

The amplified negative polarity pulse appearing at the anode 53 of amplifier 11 is applied through coupling capacitor 89 to the grid 71 of inverter tube 12. Inverter 12 is conventional and has its cathode 72 tied directly to ground at 106 and receives its positive plate potential from source 52 through plate resistor 103. Inverter 12 inverts the negative polarity pulse applied to its grid 71 to a positive polarity pulse. The positive polarity pulse, taken from the anode 54 of inverter 12 is impressed on grid element 75 of coincidence tube 13 through coupling capacitor 171 and resistor 172. Coincidence tube 13 is normally biased to plate current cut-off by bleeder resistor 109, and resistance-capacitance circuit 112 and 113 tied to cathode 78. Screen grids 74 and 76, tied together, are biased from point of positive potential 52 through voltage reducing resistor 111. Suppressor grid 73 is biased from point of positive potential 52 and ground through resistors 109 and 113. Anode 55 receives its voltage from point 52 through plate resistor 110. If no signal appears at grid 77 of coincidence tube 13, a negative polarity pulse is produced at the anode 55 which is applied through coupling capacitor 127 to the cathode 79 of diode decoupler 14.

Diode decouplers 14, 24 and 34 are employed in the circuits to permit the paralleling of all the output channel pulses on a common line without mutual interaction between the discriminator stages and for making the circuits non-critical with regard to selection of the coincidence discriminator tubes. Cathode 79 of decoupling tube 14 is tied to ground 126 through resistor 124 and the paralleled plates of all the decoupler tubes are grounded at 126 through a common resistor 125. Paralleling of all the output channels is illustrated here by decoupling tubes 14, 24 and 34 each having its cathode connected to its particular channel discriminator through coupler capacitors 127, 128 and 129 respectively and the output from each plate being tied to a common line and fed through coupling capacitor 138 to grid 87 of inverter 15. The purpose of tying the outputs of all the channels together is to having a single output terminal for the gamma radiation and to simplify the circuitry in preventing coincidence tube 45 to conduct on the occurrence of a single event.

Inverter tube 15 is identical in circuit design as inverter tube 12 and serves merely to invert the negative polarity pulse applied to its grid 87 into a positive polarity pulse. The positive polarity pulse is taken from anode 64 and applied through coupling capacitor 161 to terminal 18 to give an indication thereof of the detection of gamma radiation. The outputs 18 and 47 may be connected to any suitable utilization device such as a pulse rate meter or recorder.

In the event that the pulse appearing at point source 10 is not a single pulse but is coincident with a pulse from one or more of the other counter tubes, there is tied to the output of the amplifier of each channel a diode mixer for each additional channel. This is shown in Fig. 2 by diode mixers 16 and 17 which are respectively tied to the output of the amplifiers 21 and 31 of the second and third channels. The output of the amplifiers 21 and 31 (of Fig. 1) are tied to the cathodes 82 and 83 through coupling capacitors 115 and 117. The anodes 59 and 60 of the diode mixers 16 and 17 are tied to a common line so that a signal in any one of the additional channels will appear as a negative pulse at the output thereof. This negative pulse is applied to grid 77 of coincidence tube 13 through coupling capacitor 114.

It was above stated that coincidence tube 13 is normally biased to non-conduction and that the appearance of a positive pulse on grid 75 will render it conductive. However, if there also appears a negative pulse on grid 77, as just described, in addition to the positive pulse on grid 75, coincidence tube 13 will be maintained at its non-conducting state. In this manner there is prevented from appearing an output pulse at anode 55 of coincidence tube 13 if the signal source is coincident (cosmic radiation) and not a single pulse (gamma radiation).

In order to indicate the highly ionizing cosmic radiation that may be detected in the bundle of Geiger tube detectors, vacuum tubes 41 through 45 form an additional channel operative in conjunction with the plurality of single signal channels. The output signals appearing at the plate of the amplifier in each channel are applied to the cathodes of corresponding mixer tubes 41, 42 and 43. This is shown in the circuitry of the single channel of Fig. 1 by lead 65 being connected from anode 53 of vacuum 11 to cathode 84 of vacuum tube 41 through coupling capacitor 132. The output of amplifiers 21 and 31 of the second and third channels are connected to cathodes 85 and 86 of mixer diodes 42 and 43 through coupling capacitors 133 and 134. The cathodes 84, 85 and 86 of mixer tubes 41, 42 and 43 are each tied to ground through resistive elements 135, 136 and 137 respectively. The anodes 61, 62 and 63 are effectively paralleled by being tied to common line 170. There is presented then to grid 91 of inverter tube 44, through common line 170 and coupling capacitor 164, a negative polarity pulse whenever any one or all the input circuits are active.

Inverter 44 merely serves the function of inverting the negative pulse applied to its grid 91 from common line 170 into a positive pulse. The cathode 92 of inverter tube 44 is connected to ground 155 through resistor 149 and grid 91 is connected to ground 155 through resistor 148. The anode 66 of inverter 44 is connected to source of positive potential 52 through plate resistor 142. The positive polarity pulse appearing at anode 66 of inverter 44 is applied, through coupling capacitor 145 and resistor 147 to grid 97 of coincidence tube 45.

Coincidence tube 45 is operative much in the same manner as coincidence tube 13. Coincidence tube 45 is normally biased to plate current cut-off through capacitance 152 and resistance 153 tied to cathode 100 and ground 155 and source of positive potential 52 through bleeder resistor 146. The suppressor grid 95 is also tied to source of positive potential 52 through resistor 146. Anode 68 is tied through resistor 157 to source 52 and combined grids 96 and 98 are tied through voltage reducing resistor 156, to source 52 and by-passed to ground through capacitance 154. These positive grids 96 and 98 functioning as the screen grid for the intermediate grid 97.

In the event of the application to grid 97 of a positive pulse from inverter 44, coincidence tube 45 is raised to its conduction state and there appears a negative pulse at anode 68 which is applied through capacitance 163 to grid 93 of inverter 46. Inverter 46 is operative in exactly the same manner as inverters 12 and 15 and serves to invert the negative pulse impressed on its grid 91 to a positive pulse at its anode circuit 67. The positive pulse is then applied through capacitance 162 to output terminal 47.

An output pulse at terminal 47 is indicative of a coincident firing of at least two of the Geiger tubes in the bundle. If however, as explained above with respect to the block-schematic diagram, there is only a single firing of one Geiger tube there will be prevented from appearing a pulse at the output terminal 47. Although a positive pulse sufficient to render coincidence tube 45 conductive will be applied thereto in the event only a single Geiger tube and its associated channel is active, coincidence tube 45 will be maintained at its non-conductive state by the application of a negative pulse at its reject grid 99. The negative pulse applied to reject grid 99 is obtained from the input to inverter 15 through capacitor 141 and resistor 142. It may be recalled that through the use of mixer tubes 14, 24 and 34 interconnecting the various channels, there can be no pulse at the input of inverter 15 unless it has its source from a single pulse (gamma radiation).

It is seen then, that through the interconnection of the several channels there can only be a pulse output at terminal 18 if its source is from gamma radiation. Also through interconnecting the common output of the several channels and coincident firing channel there can only be an output at terminal 47 in the event that its source is from cosmic radiation. Thusly it necessarily follows that only one output may be had at a time, an output at one terminal prevents an output at the other terminal.

Although I have shown only certain and specific embodiments of the present invention, it is to be expressly understood that many modifications are possible thereof without departing from the true spirit of the invention.

The invention described herein may be manufactured and used by or for the Government of the United States of America for governmental purposes without the payment of any royalties thereon or therefor.

What is claimed is:

1. An electrical system for discriminating between synchronous and non-synchronous signals produced by a plurality of distinct signal sources, comprising: a separate signal transmission channel coupled to each signal source to translate signals obtained therefrom, each channel including a circuit responsive to the presence of a signal in any of the other channels for blocking signal transmission through such channel; means combining the outputs from said channels, an auxiliary signal transmission channel coupled to all of said signal sources to translate signals therefrom, including a circuit therein responsive to an output from said combining means to block signal transmission through such auxiliary channel.

2. An electrical system for discriminating between synchronous and non-synchronous signals produced by a plurality of distinct signal sources, comprising a separate signal transmission channel coupled to each signal source to translate signals obtained therefrom, each channel including a circuit responsive to the presence of a signal in any of the other channels for blocking signal transmission through such channel; means combining the outputs from said channels, an auxiliary signal transmission channel coupled to all of said signal sources to translate signals therefrom, including at least one vacuum tube having an anode, a cathode and a first and second grid electrode, bias means for maintaining said vacuum tube non-conducting, means for coupling all of said signal sources to the first grid electrode to produce an output pulse at said anode, and means for connecting the output of said combining means to the second grid electrode to block signal transmission through such auxiliary channel.

3. An electrical system for discriminating between synchronous and non-synchronous signals produced by a plurality of distinct signal sources, comprising: a separate signal transmission channel coupled to each signal source to translate signals obtained therefrom, each channel including at least one vacuum tube having an anode, a cathode and at least a first and second grid electrode, bias means for maintaining said vacuum tube non-conducting, means for connecting the signal source to the first grid electrode to produce an output pulse at said anode at the presence of a signal in said channel, circuit means responsive to the presence of a signal in any of the other channels connected to said second grid electrode for blocking signal transmission through such channel, means combining the outputs from said channels, an auxiliary signal transmission channel coupled to all of said signal sources to translate signals therefrom, including a circuit therein responsive to an output from said combining means to block signal transmission through such auxiliary channel.

4. An electrical system for discriminating between synchronous and non-synchronous signals produced by a plurality of distinct signal sources, comprising: a separate signal transmission channel coupled to each signal source to translate signals obtained therefrom, each channel including at least one vacuum tube having an anode, a cathode and at least a first and second grid electrode, bias means for maintaining said vacuum tube non-conducting, means for connecting the signal source to the first grid electrode to produce an output pulse at said anode at the presence of a signal in said channel, circuit means responsive to the presence of a signal in any of the other channels connected to said second grid electrode for blocking signal transmission through such channel, means combining the outputs from said channels, an auxiliary signal transmission channel coupled to all of said signal sources to translate signals therefrom, also including at least one vacuum tube having an anode, a cathode and a first and second grid electrode, bias means for maintaining said last named vacuum tube non-conducting, means for coupling all of said signal sources to the first grid electrode to produce an output pulse at said anode, and means for connecting the output of said combining means to the second grid electrode to block signal transmission through such auxiliary channel.

5. In combination, a plurality of Geiger-Mueller tubes, an electrical system for discriminating between synchronous and non-synchronous signals produced by said tubes, comprising: a separate signal transmission channel coupled to each Geiger-Mueller tube to translate signals obtained therefrom, each channel including circuit means responsive to the presence of a signal in any of the other channels for blocking signal transmission through such channel, means combining the outputs from said channels, an auxiliary signal transmission channel coupled to all of said signal sources to translate signals therefrom, including a circuit therein responsive to an output from said combining means to block signal transmission through such auxiliary channel.

6. In combination, a plurality of Geiger-Mueller tubes, an electrical system for discriminating between synchronous and non-synchronous signals produced by said tubes, comprising: a separate signal transmission channel coupled to each Geiger-Mueller tube to translate signals obtained therefrom, each channel including at least one vacuum tube having an anode, a cathode and at least a first and second grid electrode, bias means for maintaining said vacuum tube non-conducting, means for connecting the Geiger-Mueller tube to the first grid electrode to produce an output pulse at said anode at the presence of a signal in said channel, circuit means responsive to the presence of a signal in any of the other channels connected to said second grid electrode for blocking signal transmission through such channel, means combining the outputs from said channels, an auxiliary signal transmission channel coupled to all of said Geiger-Mueller tubes to translate signals therefrom, including a circuit therein responsive to an output from said combining means to block signal transmission through such auxiliary channel.

7. In combination, a plurality of Geiger-Mueller tubes, an electrical system for discriminating between synchronous and non-synchronous signals produced by said tubes, comprising: a separate signal transmission channel coupled to each Geiger-Mueller tube to translate signals obtained therefrom, each channel including at least one vacuum tube having an anode, a cathode and at least a first and second grid electrode, bias means for maintaining said vacuum tube non-conducting, means for connecting the Geiger-Mueller tube to the first grid electrode to produce an output pulse at said anode at the presence of a signal in said channel, circuit means responsive to the presence of a signal in any of the other channels connected to said second grid electrode for blocking signal transmission through such channel, means combining the outputs from said channels, an auxiliary signal transmission channel coupled to all of said signal sources to translate signals therefrom, also including at least one vacuum tube having an anode, a cathode and a first and second grid electrode, bias means for maintaining said last named vacuum tube non-conducting, means for coupling all of said signal sources to the first grid electrode to produce an output pulse at said anode, and means for connecting the output of said combining means to the second grid electrode to block signal transmission through such auxiliary channel.

8. In combination, a plurality of radio activity detector tubes, an electrical system for discriminating between synchronous and non-synchronous signals produced by said tubes, comprising: a separate signal transmission channel coupled to each signal source to translate signals obtained therefrom, each channel including a circuit responsive to the presence of a signal in any of the other channels for blocking signal transmission through such channel; means combining the outputs from said channels, an auxiliary signal transmission channel coupled to all of said signal sources to translate signals therefrom, including at least one vacuum tube having an anode, a cathode and a first and second grid electrode, bias means for maintaining said vacuum tube non-conducting, means for coupling all of said signal sources to the first grid electrode to produce an output pulse at said anode, and means for connecting the output of said combining means to the second grid electrode to block signal transmission through such auxiliary channel.

SAMUEL W. LICHTMAN.

REFERENCES CITED

The following references are of record in the file of this patent:

UNITED STATES PATENTS

| Number | Name | Date |
|---|---|---|
| 2,457,790 | Wild et al. | Dec. 28, 1948 |
| 2,505,074 | Trevor | Apr. 25, 1950 |

OTHER REFERENCES

"Electron and Nuclear Counters"—Korff, published April 1946 by Van Nostrand Co., Inc., pages 164–171.

Theory and Operation of G-M Counters, Brown Nucleonics, 1948, pages 48–52.

Article "Radiation Instruments Using Geiger Muller Tubes," by Weisz, October 1942, Electronics, pages 44 et seq.